United States Patent [19]

Kishi

[11] Patent Number: 5,023,771
[45] Date of Patent: Jun. 11, 1991

[54] CONTROLLER FOR TWO TIMERS OF A VIRTUAL MACHINE SYSTEM, ONE UPDATED ONLY IN THE VMOS MODE

[75] Inventor: Takao Kishi, Tokyo, Japan

[73] Assignee: NEC Corporation, Tokyo, Japan

[21] Appl. No.: 580,367

[22] Filed: Sep. 7, 1990

Related U.S. Application Data

[63] Continuation of Ser. No. 147,546, Jan. 25, 1988, abandoned.

[30] Foreign Application Priority Data

Jan. 26, 1987 [JP] Japan .................................. 62-14278

[51] Int. Cl.$^5$ .......................... G06F 9/00; G06F 9/46
[52] U.S. Cl. .................... 364/200; 364/200; 364/900
[58] Field of Search ................................ 364/200, 900

[56] References Cited

U.S. PATENT DOCUMENTS

| | | |
|---|---|---|
| 4,161,787 | 7/1979 | Groves et al. ............... 364/900 |
| 4,400,769 | 8/1983 | Kaneda et al. ............... 364/200 |
| 4,812,967 | 3/1989 | Hirosawa et al. ............ 364/200 |
| 4,814,975 | 3/1989 | Horosawa et al. ........... 364/200 |
| 4,816,992 | 3/1989 | Matsumoto ................... 364/200 |
| 4,860,190 | 8/1989 | Kaneda et al. ............... 364/200 |
| 4,885,681 | 12/1989 | Umeno et al. ................ 364/200 |

Primary Examiner—Michael R. Fleming
Assistant Examiner—Christopher B. Shin
Attorney, Agent, or Firm—Foley & Lardner

[57] ABSTRACT

For use in a virtual machine system including a mode register indicative of one of NVM, VMM, and VMOS modes in which the virtual machine system is operating, a timer controller comprises a first timer and updated when the mode register indicates whichever of the NVM, VMM, and VMOS modes, a second timer coupled to the mode register and updated only when the mode register indicates the VMOS mode, and interruption receiving circuit for receiving a first interruption as a first received interruption and a second interruption as a second received interruption when the first and the second timers are updated to a predetermined value, respectively, and an arrangement for informing a host operating system of the first received interruption and guest operating systems of the second received interruption. Preferably, the arrangement is coupled to the mode register to inform the host operating system of the first received interruption when the mode register indicates either the NVM or VMM mode. When the mode register indicates the VMOS mode, the arrangement reports the first received interruption to a virtual machine control program of the host operating system.

3 Claims, 5 Drawing Sheets

CONTROLLER FOR TWO TIMERS OF A VIRTUAL MACHINE SYSTEM, ONE UPDATED ONLY IN THE VMOS MODE

This application is a continuation of application Ser. No. 07/147,546, filed Jan. 25, 1988, now abandoned.

BACKGROUND OF THE INVENTION

This invention relates to a timer controller for use in a virtual machine system.

It is known in the art that a virtual machine system comprises a real central processing unit (real CPU) and is operable in one of a plurality of modes. The modes comprise a non-virtual machine (NVM) mode, a virtual machine monitoring (VMM) mode, and a virtual machine operating system (VMOS) mode.

In the manner which will later be described more in detail, an operating system (OS) is run on the real central processing unit. When run on the real central processing unit, the operating system is named a host operating system in the art. In compliance with the host operating system, the non-virtual machine mode runs ordinary jobs, one for each user. In place of the ordinary jobs, the virtual machine monitoring mode runs a virtual machine control program (VMCP) in compliance with the host operating system as a specific job of the host operating system. When run, the virtual machine control program forms and controls a plurality of guest operating systems. In compliance with each guest operating system, the virtual machine operating system mode runs others of the ordinary jobs. It is therefore possible to understand that the virtual machine operating system mode runs the guest operating systems.

According to U.S. patent application Ser. No. 908,269 filed Sept. 17, 1986, by the present applicant based on Japanese Patent Application No. 205,533 of 1985, a mode register is used in such a virtual machine system. The mode register may comprise two one-bit memories and indicate one of the non-virtual machine mode, the virtual machine monitoring mode, and the virtual machine operating system mode in which the virtual machine system is operating for each user.

It will also be described more in detail later in the following that interruption is received by the real central processing unit for dispatch of the jobs run in the non-virtual machine mode and of the virtual machine control program which is run in the virtual machine monitoring mode. The host operating system is informed of occurrence of the interruption. The interruption may therefore be called a host operating system interruption.

Similarly, interruption is received for the guest operating systems and for the jobs which are run in the virtual machine operating system mode. Through the virtual machine control program, the host operating system is informed of occurrence of the interruption for dispatch of the guest operating systems. This interruption will be named a primary virtual machine operating system interruption. On the other hand, the guest operating system is informed of occurrence of the interruption for dispatch of the jobs run in the virtual machine operating system mode and judges whether or not the guest operating system can deal with the interruption. Only when the guest operating system can not deal with the interruption, guest operiting system reports the occurrence of interruption to the host operating system through the virtual machine control program. This latter interruption will be termed a secondary virtual machine operating system interruption.

In a conventional virtual machine system, a timer register or timer is used on dealing with the host operating system interruption. A different timer register is used on dealing with both the primary and the secondary virtual machine operating system interruptions. Control of the different timer register is therefore complicated as will later become clear. This results in an increased overhead.

SUMMARY OF THE INVENTION

It is therefore an object of the present invention to provide a timer controller which is for use in a virtual machine system and which is simply operable with a reduced overhead.

It is another object of this invention to provide a timer controller of the type described, which simplifies a dispatch process for a guest operating system or for a job which is run in compliance with the guest operating system.

Other objects of this invention will become clear as the description proceeds.

On describing the gist of this invention, it is possible to understand that a timer controller is for use in a virtual machine system which comprises a real central processing unit and is operable in a non-virtual machine mode of running an ordinary job in compliance with a host operating system run on the real central processing unit, a virtual machine monitoring mode of running a virtual machine control program in compliance with the host operating system to form and control a plurality of guest operating systems, and a virtual machine operating system mode of running the guest operating systems and that the timer controller includes a mode register indicative of one of the non-virtual machine mode, the virtual machine monitoring mode, and the virtual machine operating system mode in which the virtual machine system is operating.

According to this invention, the above-understood timer controller is characterised by: (A) a first timer coupled to the mode register and updated when the mode register indicates whichever of the non-virtual machine mode, the virtual machine monitoring mode, and the virtual machine operating system mode; (B) a second timer coupled to the mode register and updated when the mode register indicates neither the non-virtual machine mode nor the virtual machine monitoring mode but only the virtual machine operating system mode; (C) an interruption receiving circuit which is coupled to the first and the second timers, which receives a first interruption as a first received interruption only when the first timer is updated to a first predetermined value, and which receives a second interruption as a second received interruption only when the second timer is updated to a second predetermined value; and (D) informing means coupled to the interruption receiving circuit for informing the host operating system of the first received interruption and the guest operating systems of the second received interruption.

BRIEF DESCRIPTION OF THE DRAWING

FIG. 2, extended over two sheets as FIGS. 2(a) and (b), shows various memory divisions, sections, and blocks of a memory of the virtual machine system mentioned in conjunction with FIG. 1;

FIG. 3, drawn on two sheets as FIGS. 3(a) and (b), is a block diagram of a real central processing unit and gates which are used in the virtual machine system mentioned in connection with FIGS. 1 and 2 and which comprises a timer controller according to an embodiment of this invention.

DESCRIPTION OF THE PREFERRED EMBODIMENT

Figure 1:
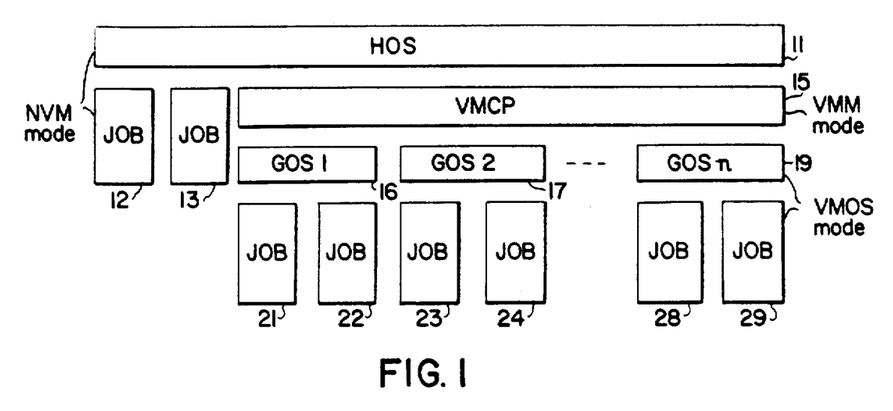
FIG. 1 is a diagram for use in describing operation of a virtual machine system in order to facilitate an understanding of the instant invention.

Referring to FIG. 1, a virtual machine system will generally be described at first in order to facilitate an understanding of the present invention. The virtual machine system comprises a real central processing unit (real CPU) which will later be illustrated. It is known in the art that the virtual machine system is operable in one of a plurality of modes for a certain duration of time for each user. The modes comprise a non-virtual machine (NVM) mode, a virtual machine monitoring (VMM) mode, and a virtual machine operating system (VMOS) mode.

An operating system (OS) is run on the real central processing unit. When run on the real central processing unit, the operating system is termed a host operating system (HOS) and is depicted at 11. In compliance with the host operating system 11, the non-virtual machine mode runs a plurality of ordinary jobs, such as 12 and 13, one for a duration of time for each user. Instead of the ordinary jobs 12 and 13, the virtual machine monitoring mode runs a virtual machine control program (VMCP) 15 in compliance with the host operating system 11 as a particular job of the host operating system 11.

When run, the virtual machine control program 15 forms and controls first through n-th guest operating systems (GOS's) 16, 17, ..., and 19. In compliance with each guest operating system, the virtual machine operating system mode runs others of the ordinary jobs. It will be assumed that the virtual machine operating system mode runs ordinary jobs 21 and 22 in compliance with the first guest operating system 16 and ordinary jobs 23 and 24 in compliance with the second guest operating system 17. In this manner, ordinary jobs 28 and 29 are run in compliance with the n-th guest operating system 19. It is possible to understand that the virtual machine operating system mode runs the guest operating systems 16 through 19.

In short, the virtual machine system is operable in a selected one of the non-virtual machine mode of running the ordinary job 12 or 13 and the virtual machine monitoring mode of running the virtual machine control program 15. Such ordinary jobs 12 and 13 and the virtual machine control program 15 are run under the control of the host operating system 11. Alternatively, the virtual machine system is operable in the virtual machine operating system mode of running the guest operating systems 16 through 19. In the virtual machine operating system mode, the ordinary jobs 21 through 29 are run under the control of the guest operating systems 16 to 19.

The jobs 12 and 13, the virtual machine control program 15, the guest operating systems 16 through 19, and the jobs 21 through 29 are dispatched by interruption received by the real central processing unit. During a short while, the interruption will be called a host operating system interruption when received while the jobs 12 and 13 are run in the non-virtual machine mode and while the virtual machine control program 15 is run in the virtual machine monitoring mode. The interruption will be termed a primary virtual machine operating system interruption when received while the guest operating systems 16 to 19 are run. The interruption will be named a secondary virtual machine operating system interruption when received while the jobs 21 through 29 are run in the virtual machine operating system mode. The primary and the secondary virtual machine operating system interruptions will collectively be referred to as a virtual machine operating system interruption.

Figure 2A:
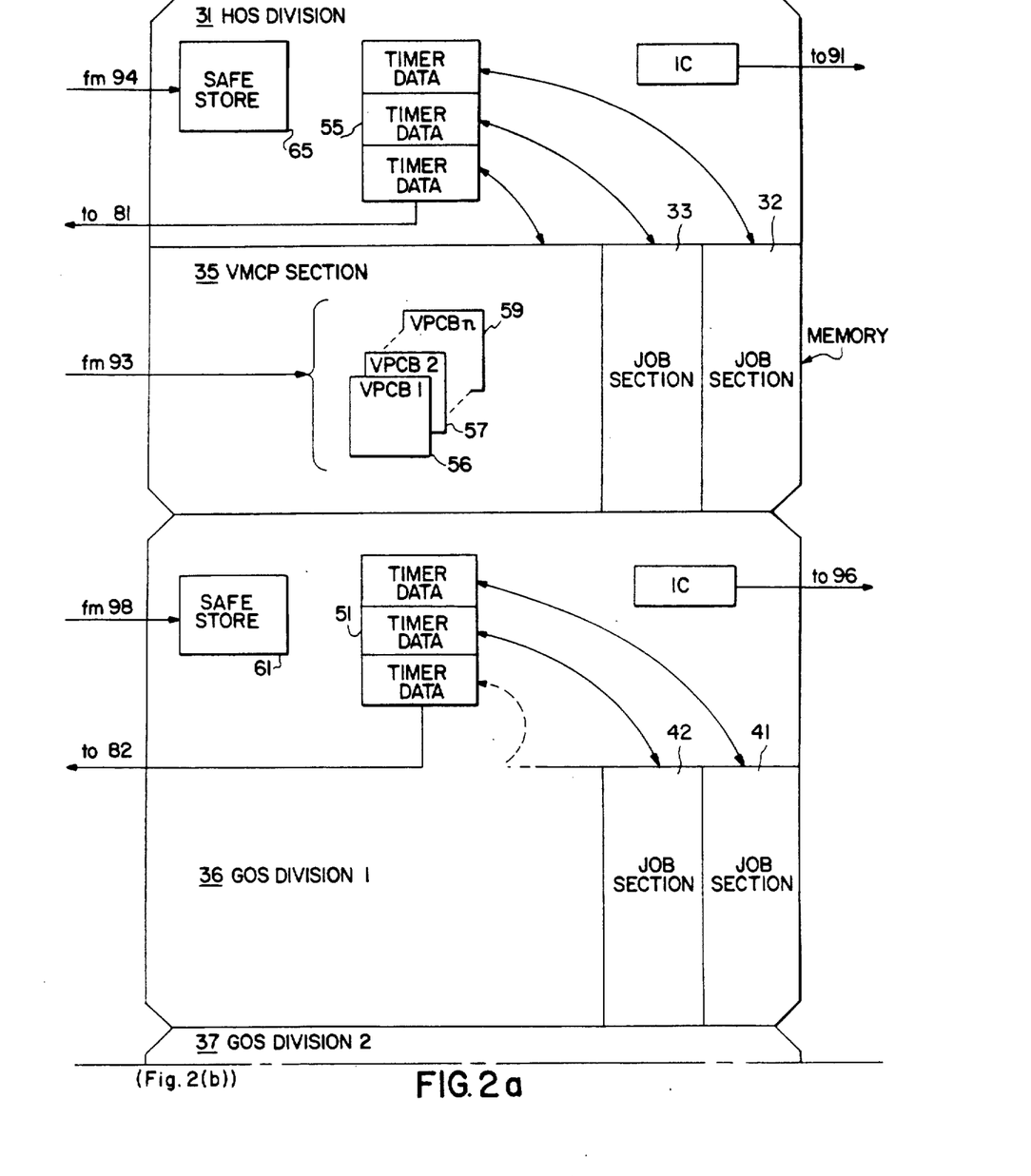
Figure 2B:
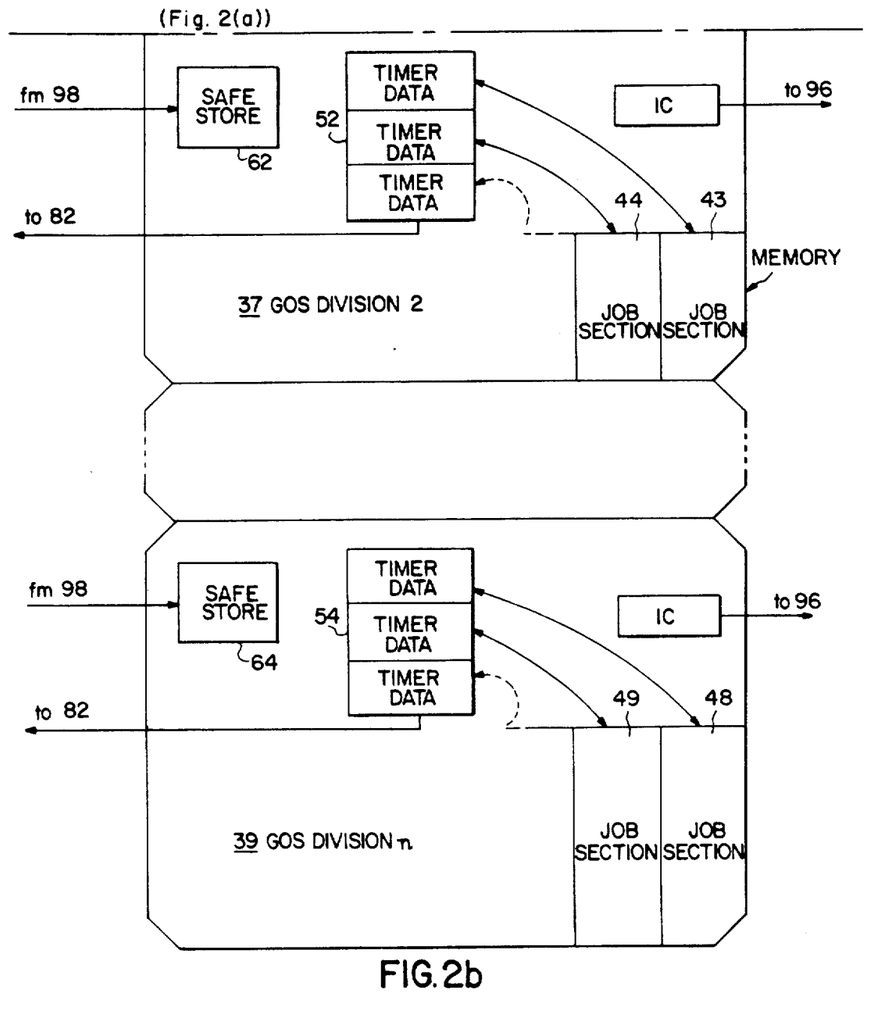

Referring to FIG. 2 in addition to FIG. 1, a memory of the virtual machine system comprises a host operating system (HOS) division 31 which, in turn, comprises job sections 32 and 33 for the ordinary jobs 12 and 13 and a virtual machine control program (VMCP) section 35 for the virtual machine control program 15. First through n-th guest operating system (GOS) divisions 36, 37, ..., and 39 are for the first through the n-th guest operating systems 16 to 19 and comprise job sections 41, 42, 43, 44, ..., 48, and 49 for the ordinary jobs 21 to 29 and first through n-th timer data sections 51, 52, ..., and 54 for the job sections 41 through 49 of the respective guest operating system divisions 36 to 39.

The host operating system division 31 comprises a host timer data section 55 for the job sections 32 and 33 and for the virtual machine control program section 35. The virtual machine control program section 35 comprises a control program block (not shown) and first through n-th virtual processor control blocks (VPCB's) 56, 57, ..., and 59 for controlling the first through the n-th guest operating system divisions 36 to 39. On the other hand, the guest operating system divisions 36 to 39 comprise first through n-th safe stores 61, 62, ..., and 64. The host operating system division 31 comprises a host safe store 65. The host and the first through the n-th safe stores 65 and 61 to 64 collectively serve as a save area or section.

In the manner indicated by a curved line having arrowheads on both ends, the host timer data section 55 has a timer data block for keeping timing data of progress of the job section 32 and, accordingly, of execution of the ordinary job 12. This applies to the virtual machine control program section 35 and similarly to the first through the n-th timer data sections 51 to 54.

In the manner known in the art, interruption may be received while one of the ordinary jobs 12 and 13 is run in the non-virtual machine mode. Upon reception of the interruption as the host operating system interruption, information related thereto is saved in the host safe store 65. The interruption may be received also as the host operating system interruption while the virtual machine control program 15 is run in the virtual machine monitoring mode. Information related to this latter interruption is saved in one of the virtual processor control blocks 56 through 59 that is indicated by the control program block of the virtual machine control program section 35. In either event, the host operating system division 31 is informed of occurrence of the interruption in the manner which will later be exemplified.

In the known manner, interruption may be received as the primary virtual machine operating system interruption while one of the guest operating systems 16 through 19 is run in the virtual machine operating system mode. Information related to the interruption is saved in the virtual processor control blocks 56 through 59 in compliance with indication by the control program block. In this manner, the virtual machine control section 35 of the host operating system division 31 is informed of occurrence of the primary virtual machine operating system interruption. Alternatively, interruption may be received as the secondary virtual machine operating system interruption while one of the ordinary jobs 21 through 29 is run in the virtual machine operating system mode. Information related to the secondary virtual machine operating system interruption is saved in the safe stores 61 through 64 according to the indication by the control program block. In the manner which will later be exemplified, occurence of the secondary virtual machine operating system interruption is reported to one of the guest operating system divisions 36 through 39 and consequently to one of the guest operating systems 16 through 19 that is indicated by the control program block as a particular operating system. It is known in the art that the particular operating system judges whether or not the particular operating system can deal with the secondary virtual machine operating system interruption. When possible, the particular operating system deals with the interruption under consideration. Only when impossible, the particular operating system reports occurrence of the interruption in question to the virtual machine control program section 35 of the host operating system 11.

In the manner which will presently be illustrated, the real central processing unit comprises a plurality of timer registers or timers. In a conventional timer controller, a single one of the timer registers is used in dispatching one of the guest operating systems 16 through 19 in response to the primary virtual machine operating system interruption and also in dispatching one of the ordinary jobs 21 through 29 in response to the secondary virtual machine operating system interruption. It has therefore been necessary on setting a timer count in the single timer register to carry out comparison between a first timing datum assigned to one of the guest operating systems 36 to 39 and a second timing datum assigned to one of the job sections 41 to 49 and to set a smaller one of the first and the second timing data in the single timer register. This is complicated and results in an objectionably increased overhead.

Figure 3A:
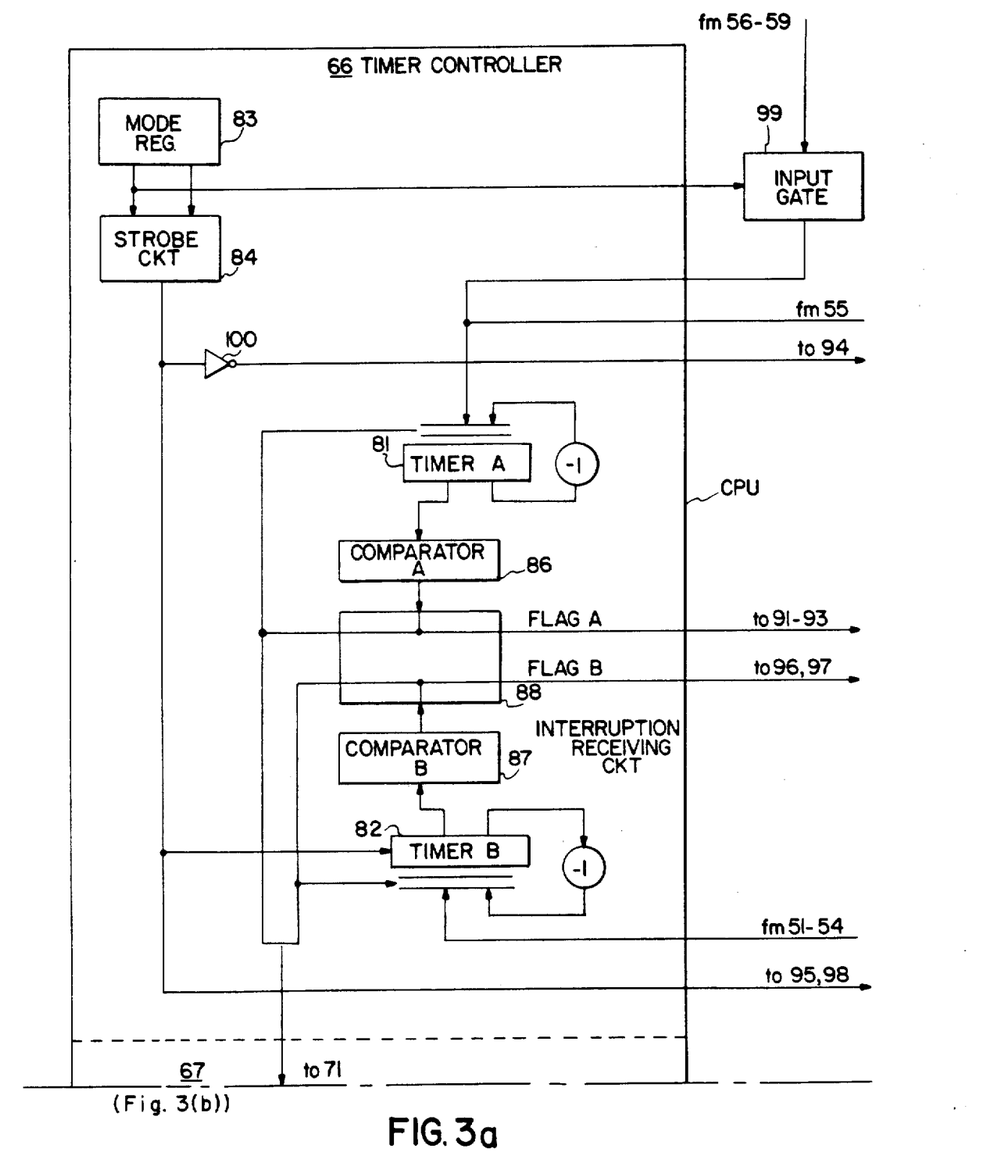
Figure 3B:
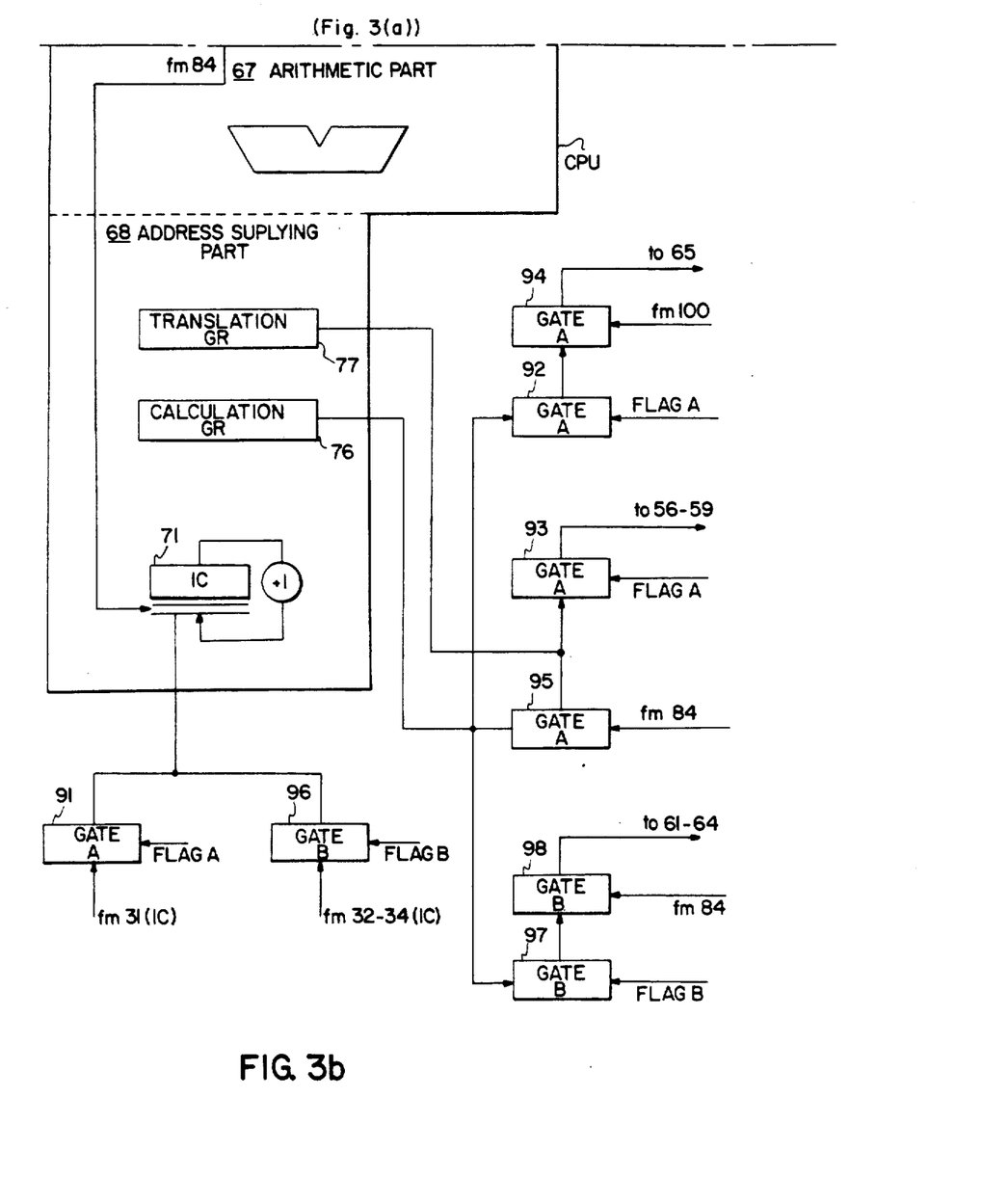

Referring now to FIG. 3 as well as to FIGS. 1 and 2, the real central processing unit comprises a timer controller 66 according to a preferred embodiment of this invention in addition to an arithmetic part 67 and an instruction supplying part 68. In the manner known in the art, the arithmetic part 67 comprises an arithmetic unit which is symbolically depicted. The instruction suppling part 68 comprises an instruction sequence counter (IC) 71 for an instruction sequence count, an address calculation GR (general purpose register) 76 having a first content indicative of a logical address datum, and an address translation GR 77 having a second content indicative of a real address at which an address translation table (not shown) is memorized. In the manner which will readily be understood from FIG. 3, the instruction sequence counter 71 is accompanied by a counter input selector, through which the instruction sequence count is usually counted up in the known manner.

The timer controller 66 comprises first and second or A and B timer registers or timers 81 and 82 accompanied by first and second input selectors. It will be understood from the description related to the conventional timer controller that attention should be directed to the interruption which the first and the second timer registers 81 and 82 give rise to. According to this invention, only the second timer register 82 is controlled to be operable neither in the non-virtual machine mode nor in the virtual machine monitoring mode but in the virtual machine operating system mode alone. For this purpose, a mode register 83 is used for keeping a mode datum in the manner which will shortly be exemplified. Responsive to the mode datum, a strobe circuit 84 produces a strobe signal which controls the second timer register 82 among others.

In the manner described in the U.S. patent application Ser. No. 908,269 referred to hereinabove, the mode register 83 may comprise first and second one-bit memories which are placed leftwardly and rightwardly of the figure and in which first and second binary bits are set collectively as the mode datum for a mode memory block (not shown) of the host operating system division 31. In this event, the strobe circuit 84 is preferably a two-input AND gate, for which the binary bits represent logic one and/or zero levels. The strobe signal has either the logic one or the logic zero level.

It will be presumed that the non-virtual machine mode is indicated either by (0,0) or by (0,1). The virtual machine monitoring mode is indicated by (1,0) and the virtual machine operating system mode, by (1,1). Under the circumstances, the strobe signal has the logic zero level both in the non-virtual machine mode and in the virtual machine monitoring mode. Only in the virtual machine operating system mode, the strobe signal has the logic one level. Incidentally, the first bit of the mode datum is used as a gating signal which has the logic zero level only in the non-virtual machine mode and the logic one level either in the virtual machine monitoring mode or in the virtual machine operating system mode.

Being not controlled by the strobe signal, the first timer register 81 is operable in all of the non-virtual machine mode, the virtual machine monitoring mode, and the virtual machine operating system mode. Unless a first selection signal is supplied to the first input selector in the manner which will presently be described, the first timer register 81 counts down through the first input selector at a machine clock rate. In this manner, the first timer register 81 is usually updated or renewed at the machine clock rate. Only in the virtual machine operating system mode, the second timer register 82 counts down through the second input selector a second or B timer count at the machine clock rate unless a second selection signal is supplied to the second input selector. Either in the non-virtual machine mode or in the virtual machine monitoring mode, the second timer count is not counted down.

A first comparator 86 is for comparing the first timer count with a first predetermined value or count to produce an A timer run out signal as a first interruption signal whenever the first timer count is counted down to the first predetermined value. Similarly, a second comparator 87 is for producing a B timer run out signal as a second interruption signal whenever the second timer count is counted down to a second predetermined value. Typically, each of the first and the second predetermined values is given by all binary zeros.

The A and the B timer run out signals are used in an interruption receiving circuit 88 in setting first and second or A and B interruption reception flags which are illustrated within and through the interruption receiving circuit 88 merely by two horizontally parallel lines upwardly and downwardly of the figure. The first interruption reception flag indicates occurrence of either the afore-mentioned host operating system interruption or the above-described primary virtual machine operating system interruption. The second interruption reception flag indicates occurrence of the above-mentioned secondary virtual machine operating system interruption.

It is now possible to summarize that the interruption receiving circuit 88 is coupled to the first and the second timer registers 81 and 82 and receives a first interruption as a first received interruption only when the first timer register 81 is updated to the first predetermined value. The interruption receiving circuit 88 receives a second interruption as a second received interruption only when the second timer register 82 is updated to the second predetermined value during the virtual machine operating system mode alone.

In FIG. 3, first through fifth A gates 91, 92, 93, 94, and 95, first through third B gates 96, 97, and 98, and an input gate 99 are interposed between the real central processing unit and the memory illustrated with reference to FIG. 2. Each of the gates 91 through 99 may be a two-input AND gate. A combination of the second through the fifth A gates 92 to 95 and the second and the third B gates 97 and 98 may be named a gate arrangement.

The first through the third A gates 91 to 93 are opened by the first interruption reception flag. The fourth A gate 94 is opened by an inverse of the strobe signal supplied through an inverter 100, namely, either in the non-virtual machine mode or in the virtual machine monitoring mode. The fifth A gate 95 is opened by the strobe signal, namely, only in the virtual machine operating system mode. The first and the second B gates 96 and 97 are opened by the second interruption reception flag. The third B gate 98 is opened by the strobe signal, namely, only in the virtual machine operating system mode. The input gate 99 is opened by the gating signal, namely, either in the virtual machine monitoring mode or in the virtual machine operating system mode.

The first interruption reception flag is supplied to the first input selector as the afore-mentioned first selection signal. The second interruption reception flag is delivered to the second input selector as the above-described second selection signal. The first and the second interruption reception flags are fed to the counter input selector as a counter selection signal.

When the first interruption reception flag is set in the interruption receiving circuit 88, the counter input selector is supplied with the counter selection signal. In this event, the instruction sequence counter 71 is supplied as a fresh instruction sequence count through the first A gate 91 and the counter input selector with an instruction sequence count IC from the host operating system division 31. When the second interruption reception flag is set, the counter input selector is supplied also with the counter selection signal. The instruction sequence counter 71 is now supplied as a new instruction sequence count through the first B gate 96 and the counter input selector with an instruction sequence count IC from one of the first through the n-th guest operating system divisions 36 to 39 that is indicated by the control program block of the virtual machine control program section 35.

When the first interruption reception flag is set in the non-virtual machine mode, the first timer register 81 is supplied as a fresh first timer count through the first input selector with a timing datum from one of the timer data blocks of the host timer data section 55. When the first interruption reception flag is set either in the virtual machine monitoring mode or in the virtual machine operating system mode, the first timer register 81 is supplied as a new first timer count through the input gate 99 and the first input selector with a timing datum from one of the first through the n-th virtual processor control blocks 56 to 59 in compliance with indication by the control program block of the virtual machine control program section 35. The first timer register 81 is administrated in this manner by the host operating system division 31 and therefore by the host operating system 11 in whichever of the non-virtual machine mode, the virtual machine monitoring mode, and the virtual machine operating system mode.

When the second interruption reception flag is set in the virtual machine operating system mode, the second timer register 82 is supplied as a new second timer count through the second input selector with a timing datum from one of the timer data blocks of the first through the n-th timer data sections 51 to 54 under the control of indication by the control program block of the virtual machine control program section 35. In this manner, the second timer register 82 is administrated by the guest operating system divisions 36 through 39 and consequently by the guest operating systems 16 to 19 in the virtual machine operating system mode.

When the first interruption reception flag is set either in the non-virtual machine mode or in the virtual machine monitoring mode, the content of the address calculation GR 76 is delivered through the second and the fourth A gates 92 and 94 to the host safe store 65. When the first interruption reception flag is set in the virtual machine operating system mode, the content of the address calculation GR 76 is delivered through the fifth and the third A gates 95 and 93 to one of the first through the n-th virtual processor control blocks 56 to 59 in accordance with the indication by the control program block of the virtual machine control program section 35. Furthermore, the content of the address translation GR 77 is supplied through the third A gate 93 to the first through the n-th virtual processor control blocks 56 to 59 in compliance with the indication by the control program block.

In this manner, the gate arrangement checks or confirms the mode of operation of the virtual machine system with reference to the mode register 83 either by the inverse of the strobe signal or by the strobe signal. When the virtual machine system is operating either in the non-virtual machine mode or in the virtual machine monitoring mode, the gate arrangement informs the host safe store 65 of occurrence of the above-described host operating system interruption. When the virtual machine system is operating in the virtual machine operating system mode, the gate arrangement informs the virtual machine control program section 35 of occurrence of the above-mentioned primary virtual machine operating system interruption. The host operating system interruption and the primary virtual machine operating system interruption are now referred to collectively as the first interruption. The host safe store 65 and the virtual machine control program section 35 are parts which the host operating system division 31 comprises. As a consequence, it is understood that the gate arrangement informs the host operating system division 31 and consequently the host operating system 11 of occurrence of the first interruption.

When the second interruption reception flag is set in the virtual machine operating system mode, the content of the address calculation GR 76 is delivered through the second and the third B gates 97 and 98 to one of the first through the n-th safe stores 61 to 64 that is indicated by the control program block of the virtual machine control program section 35. Checking by the strobe signal the virtual machine operating system mode in which the virtual machine system is operating, the gate arrangement informs the first through the n-th guest operating system divisions 36 to 39 of occurrence of the secondary virtual machine operating system interruption which is now called the second interruption. It is therefore understood that the gate arrangement reports the second interruption to one of the first through the n-th guest operating systems 16 to 19 that is indicated as a particular operating system by the control program block of the virtual machine control program section 35. In the manner described heretobefore, the particular operating system deals with the second interruption if possible and informs, in turn, the host operating system 11 of occurrence of the second interruption if impossible to deal with the interruption in question.

Figure 4:
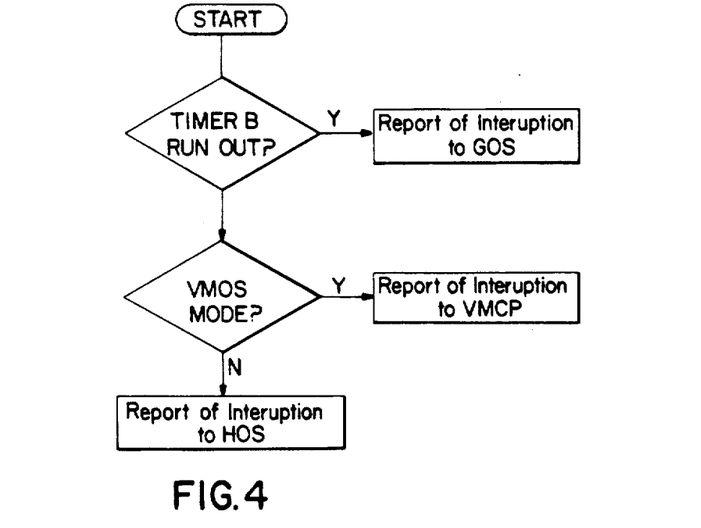
FIG. 4 is a flow chart illustrative of operation of the timer controller depicted in FIG. 3.

Referring finally to FIG. 4, operation of the timer controller 66 is shown in a simplified flow chart. The operation will be self-explanatory from the above.

It is now appreciated that the timer controller 66 is operable in a simple fashion on dispatching the first through the n-th guest operating systems 16 to 19 and also on dispatching the ordinary jobs 21 through 29 when the guest operating systems 16 to 19 are run. It is thereby possible to unexpectedly reduce the overhead.

While this invention has thus far been described in specific conjunction with a single preferred embodiment thereof, it will now be readily possible for one skilled in the art to carry this invention into effect in various other manners. For instance, it is possible to modify either the mode datum or a combination of the mode register 83 and the strobe circuit 84 in consideration of the modes in which the virtual machine system is operable. It is furthermore possible to understand that the virtual machine system separately comprises the combination of the mode register 83 and the strobe circuit 84 on the one hand and the timer controller 66 on the other hand.

What is claimed is:

1. A timer controller for use in a virtual machine system comprising a host operating system, said virtual machine system also comprising a memory and a real central processing unit, said memory comprising a host division including a plurality of first job sections storing first ordinary jobs, a virtual machine control program section storing a virtual machine control program and a plurality of guest operating system divisions each including additional job sections storing additional ordinary jobs and respective timer data sections;

said host operating system being operable in a plurality of modes including a non-virtual machine mode, a virtual machine monitoring mode and a virtual machine operating system mode, wherein, in said non-virtual machine mode said first ordinary jobs are performed in said central processing unit, in said virtual machine monitoring mode said virtual machine control program is operated to establish data for a plurality of guest operating systems, and in said machine operating system mode data is established for said additional ordinary jobs and said additional ordinary jobs are performed;

said timer controller including a mode register indicating one of said plurality of modes in which said virtual machine system is operating, wherein the improvement comprises:

first timer means decremented when said mode register indicates each of said non-virtual machine mode, said virtual machine monitoring mode and said virtual machine operating system mode, said first timer means supplying a time for dispatching said first ordinary jobs in said non-virtual machine mode and said additional ordinary jobs in said virtual machine operating system mode and supplying a time for dispatching said guest operating systems in said virtual machine monitoring mode;

second timer means, coupled to said mode register, decremented only when said mode register indicates said virtual machine operating system mode but not when said mode register indicates said non-virtual machine mode or said virtual machine monitoring mode, said second timer means setting a value obtained from said timer data sections for supplying a time for dispatching said additional ordinary jobs;

an interruption signal receiving circuit, coupled to said first and second timer means, said receiving circuit receiving a first interruption signal only when said first timer means is decremented to a first predetermined value and receiving a second interruption signal only when said second timer means is decremented to a second predetermined value; and informing means, coupled said receiving circuit for informing said host operating system that said first interruption signal is received and for informing said guest operating systems that said second interruption signal is received.

2. A timer controller as claimed in claim 1, wherein:

said informing means further is coupled to said mode register, said informing means informs said host operating system that said first interruption signal is received when said mode register indicates either of said non-virtual machine mode and said virtual machine monitoring mode and said informing means informs said guest operating systems that said second interruption signal is received when said mode register indicates said virtual machine operating system mode.

3. A timer controller as claimed in claim 2, wherein:

said host division of said memory stores said host operating system and said guest operating systems division of said memory stores said guest operating systems; and said first timer means is operated in conjunction with said guest operating systems in said virtual machine operating system mode alone.

* * * * *